(12) United States Patent
Pihur

(10) Patent No.: US 11,048,819 B2
(45) Date of Patent: Jun. 29, 2021

(54) DATA PRIVACY USING A PODIUM MECHANISM

(71) Applicant: Snap Inc., Santa Monica, CA (US)

(72) Inventor: Vasyl Pihur, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/741,193

(22) Filed: Jan. 13, 2020

(65) Prior Publication Data

US 2020/0279054 A1 Sep. 3, 2020

Related U.S. Application Data

(60) Provisional application No. 62/812,207, filed on Feb. 28, 2019.

(51) Int. Cl.
G06F 21/62 (2013.01)
G06F 17/18 (2006.01)

(52) U.S. Cl.
CPC .......... *G06F 21/6245* (2013.01); *G06F 17/18* (2013.01)

(58) Field of Classification Search
CPC ..... G06F 21/6245; G06F 17/18; H04L 9/0894
See application file for complete search history.

(56) References Cited

U.S. PATENT DOCUMENTS

| | | | | |
|---|---|---|---|---|
| 2007/0124268 A1* | 5/2007 | Dwork | ............... | G06Q 50/26 |
| 2007/0130147 A1* | 6/2007 | Dwork | ............... | G06F 21/6245 |
| 2007/0136027 A1* | 6/2007 | Dwork | ............... | G06F 21/6245 |
| | | | | 702/180 |
| 2007/0143289 A1* | 6/2007 | Dwork | ............... | G06F 16/2455 |
| 2011/0283099 A1* | 11/2011 | Nath | ............... | H04L 9/008 |
| | | | | 713/150 |
| 2014/0283091 A1* | 9/2014 | Zhang | ............... | G06F 17/18 |
| | | | | 726/26 |
| 2016/0210463 A1* | 7/2016 | Fawaz | ............... | G06F 21/604 |

(Continued)

FOREIGN PATENT DOCUMENTS

WO 2014088903 6/2014
WO WO-2020176842 A1 9/2020

OTHER PUBLICATIONS

Jung, Taebo; Jung, Kangsoo; Park, Sehwa; Park, Seog; "A Noise Parameter Configuration Technique to Mitigate Detour Inference Attack on Differential Privacy", International Conference on Big Data and Smart Computing (BigComp), IEEE, Feb. 13-16, 2017, pp. 186-192.*

(Continued)

*Primary Examiner* — Victor Lesniewski

(74) *Attorney, Agent, or Firm* — Schwegman Lundberg & Woessner, P.A.

(57) ABSTRACT

Systems and methods are provided for generating noise in user data to generate privatized data. The systems and methods generate the privatized data by performing operations comprising: storing a set of input data; generating a noise distribution based on a two-step function, wherein a height of the two-step function is determined by a privacy parameter, a width of the two-step function is determined by minimizing a variance of the noise distribution, and wherein a mean of the two-step function is determined by a value of the set of input data to be privatized; applying the noise distribution to the set of input data to generate privatized noisy output data; and transmitting the resulting privatized noisy output data in response to a request for a portion of, or a complete set of, the input data.

20 Claims, 9 Drawing Sheets

(56) References Cited

U.S. PATENT DOCUMENTS

| | | | | |
|---|---|---|---|---|
| 2016/0335455 A1* | 11/2016 | Mohan | ............... | G06F 21/6254 |
| 2017/0169253 A1* | 6/2017 | Curcio | ............... | G06F 21/6254 |
| 2018/0101697 A1* | 4/2018 | Rane | ..................... | G06F 21/602 |
| 2018/0121817 A1* | 5/2018 | Datta | ..................... | G06N 5/048 |
| 2018/0349384 A1* | 12/2018 | Nerurkar | ............ | G06F 16/2465 |
| 2019/0050599 A1* | 2/2019 | Canard | ............ | G06F 16/24554 |
| 2019/0065775 A1* | 2/2019 | Klucar, Jr. | ........ | G06F 16/24554 |
| 2020/0026876 A1* | 1/2020 | Garg | .................. | G06F 21/6254 |
| 2020/0272940 A1* | 8/2020 | Sun | ..................... | G06F 21/6245 |
| 2020/0327252 A1* | 10/2020 | Mcfall | ................. | G06F 21/602 |

OTHER PUBLICATIONS

Chen, Hung-Li; Chen, Jia-Yang; Tsou, Yao-Tung; Yu, Chia-Mu; Tai, Bo-Chen; Li, Szu-Chuang; Huang, Yennun; Lin, Chia-Ming;"Evaluating the Risk of Data Disclosure Using Noise Etimation for Differential Privacy", 22nd Pacific Rim Int'l Symposium on Dependable Computing (PRDC), IEEE, Jan. 22-25, 2017, pp. 339-347.*

Han, Chao; Wang, Ke; "Sensitive Disclosures under Differential Privacy Guarantees", International Congress on Big Data, IEEE, Jun. 27-Jul. 2, 2015, pp. 110-117.*

"International Application Serial No. PCT/US2020/020331, International Search Report dated Jun. 16, 2020", 5 pgs.

"International Application Serial No. PCT/US2020/020331, Written Opinion dated Jun. 16, 2020", 5 pgs.

Geng, Quan, "The Staircase Mechanism in Differential Privacy", IEEE Journal of Selected Topics in Signal Processing, vol. 9, No. 7, (Oct. 1, 2015), 9 pgs.

Geng, Quan, "Truncated Laplacian Mechanism for Approximate Differential Privacy", arXiv preprint, arXiv:1810.00877v1, (Oct. 1, 2018), 13 pgs.

* cited by examiner

DATA PRIVACY USING A PODIUM MECHANISM

CLAIM FOR PRIORITY

The present application claims the benefit of priority to U.S. Provisional Application No. 62/812,207, filed Feb. 28, 2019, which is herein incorporated by reference in its entirety.

TECHNICAL FIELD

The present disclosure relates generally to privacy management of user data.

BACKGROUND

Modern day service providers typically collect a variety of information from users to provide different services. The information that is collected can be used for the specific transaction the user intends to perform with the service provider as well as ancillary services. For example, a user may provide personal information (e.g., sensitive data, including credentials such as credit card numbers, debit card numbers and bank account numbers, and personally identifying information such as social security numbers, names, and addresses) to access a given content delivery service and such information can subsequently be used by the content delivery service to run statistics or provide recommendations to the user. While the collection and analysis of such data can be of great benefit not only to the particular user but to other users of the service provider, it can also be the subject of considerable abuse, such as provision of the information to a third party. Such abuse can prevent many otherwise cooperative users from accessing and providing information to the service providers. For these reasons, as well as privacy regulations or regulatory constraints, when personal information is stored in databases, it is incumbent on service providers that control this data to protect the data from abuse.

BRIEF DESCRIPTION OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Figure 1:
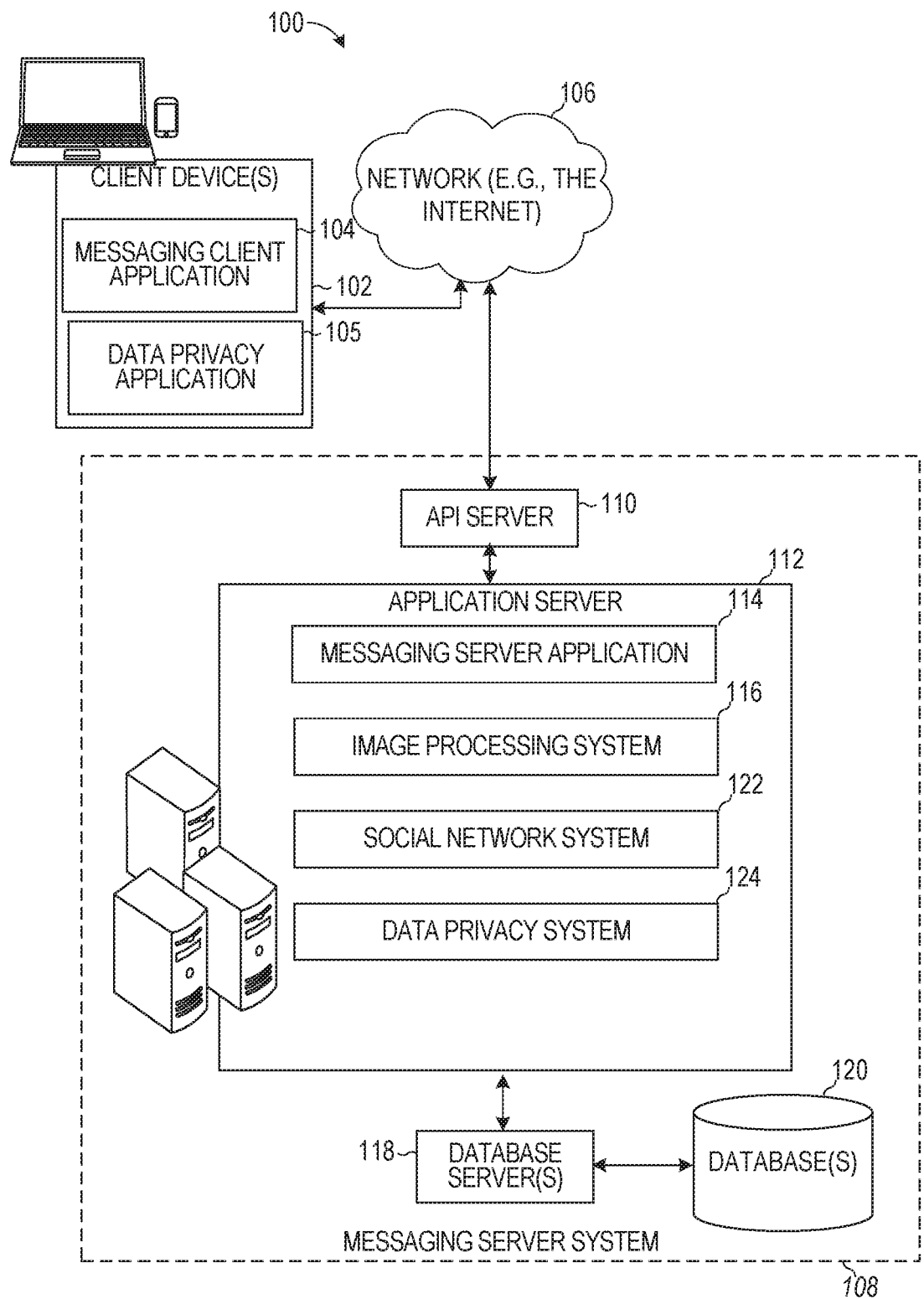
FIG. 1 is a block diagram showing an example messaging system for exchanging data (e.g., messages and associated content) over a network, according to example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typical systems employ a number of mechanisms to protect user data they collect from exposure. Such mechanisms typically are referred to as differential privacy, which introduces randomized data to a set of user data to prevent exposure of sensitive user information. Differential privacy is a statistical technique that aims to provide means to maximize the accuracy of queries from statistical databases while measuring (and, thereby, hopefully minimizing) the privacy impact on individuals whose information is in the database.

Typical systems introduce random data to a set of stored user data to protect the user data from exposure using a Laplace mechanism or a Staircase mechanism. The Laplace mechanism ensures E-differential privacy (also referred to as differential privacy) by adding noise from a Laplace distribution with mean 0 and scale $$b = \frac{\Delta}{\epsilon} \text{ where } \Delta = \max_{x_i, x_j} \|x_i - x_j\|_1$$

for a set of user data x and $\epsilon$ is a privacy parameter less than 1. The noise is added such that:

$$x' = x + L\left(0, \frac{\Delta}{\epsilon}\right) = L\left(x, \frac{\Delta}{\epsilon}\right),$$

where L is a random variable with a probability density function defined as:

$$f(z; \mu, b) = \frac{1}{2b} e^{-\frac{|z-\mu|}{b}}, \forall z \in R.$$

The Staircase mechanism samples from a geometric mixture of uniform random variables with the probability density function defined as:

$$f(z;\gamma) = \begin{cases} a(\gamma) & z \in [0, \gamma\Delta) \\ e^{-\epsilon}a(\gamma) & z \in [\gamma\Delta, \Delta) \\ e^{-k\epsilon}f_\gamma(z-k\Delta) & z\in[k\Delta, (k+1)\Delta) \\ f_\gamma(-z) & z > 0 \end{cases}$$

where $$a(\gamma) = \frac{1-e^{-\epsilon}}{2\Delta(\gamma + e^{-\epsilon}(1-\gamma))} \text{ and}$$

$$\gamma = -\frac{e^{-\epsilon}}{1-e^{-\epsilon}} + \frac{(e^{-\epsilon} - 2e^{-2\epsilon} + 2e^{-4\epsilon} - e^{-5\epsilon})^{1/3}}{2^{1/3}(1-e^{-\epsilon})^2}$$

This mechanism works well under several assumptions and is derived to minimize either $l_1$ or $l_2$ (variance) loss functions. It assumes that the domain of the output is the entire real line and that the input has a sensitivity of $\Delta$. The noise distribution of the Staircase mechanism does not change as a function of the input x and this mechanism optimizes for a single functional form using the same distribution regardless of whether noise is added to $$-\frac{\Delta}{2}, 0 \text{ or } \frac{\Delta}{10}.$$

While both prior approaches generally work well, they both generate values on the whole real line, which leads to loss of efficiency due to the possibility of extreme outliers. Also, the Staircase mechanism involves complex algebraic operations to compute its parameters, which adds computational complexity and lag to the noise generation.

The disclosed embodiments improve the efficiency of using the electronic device by addressing these shortcomings of the prior approaches in generating noise in user data. Particularly, the disclosed embodiments generate a noise distribution that is based on the user data itself using, for example, a Podium distribution or mechanism that generates noise from a truncated distribution rather than the Laplace mechanism that generates noise on the whole real line. The disclosed approaches increase the accuracy of representing the user data over the prior approaches by providing a smaller variance. The disclosed noise distribution takes samples from a "truncated" distribution, meaning its support is not the entire real line, but matches the sensitivity $\Delta$ as closely as possible by focusing noise in an improved manner over the prior approaches. Also, the shape of the distribution changes depending on the input value $$x \in \left[-\frac{\Delta}{2}, \frac{\Delta}{2}\right]$$

which ensures that the noise is centered at x. Certain parameters of the disclosed noise distribution can be pre-computed, which reduces the computational complexities and lag during runtime when noise values are generated using the noise distribution.

In some embodiments, a set of input data is stored and a noise distribution is generated based on a two-step function. A height of the two-step function is determined by a privacy parameter, a width of the two-step function is determined by minimizing a variance of the noise distribution, and a mean of the two-step function is determined by a value of the set of input data to be privatized. The noise distribution is applied to the set of input data to generate privatized noisy output data, and the resulting privatized noisy output data is transmitted in response to a request for a portion of, or a complete set of, the input data.

FIG. 1 is a block diagram showing an example messaging system 100 for exchanging data (e.g., messages and associated content) over a network 106. The messaging system 100 includes multiple client devices 102, each of which hosts a number of applications, including a messaging client application 104 and a data privacy application 105. Each messaging client application 104 is communicatively coupled to other instances of the messaging client application 104, the data privacy application 105, and a messaging server system 108 via a network 106 (e.g., the Internet).

Accordingly, each messaging client application 104 and data privacy application 105 is able to communicate and exchange data with another messaging client application 104 and data privacy application 105 and with the messaging server system 108 via the network 106. The data exchanged between messaging client applications 104, data privacy applications 105, and between a messaging client application 104 and the messaging server system 108 includes functions (e.g., commands to invoke functions) as well as payload data (e.g., text, audio, video, or other multimedia data).

The data privacy application 105 is an application that includes a set of functions that allow the client device 102 to access the data privacy system 124. In some implementations, the data privacy application 105 is a component or a feature that is part of the messaging client application 104. Data privacy application 105 allows a given user to request access or a statistical analysis of a collection of user data. For example, the user data may represent ages of a set of users and the data privacy application 105 may request the average age of the set of users. The data privacy application 105 communicates with the data privacy system 124, which applies a noise distribution to the set of data (e.g., using the Podium mechanism) to add random data and generate a result corresponding to the request. For example, the result may represent the average ages of the users that takes into account the added random data. By adding the random data, particular user's data is not exposed in response to the request.

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, virtual objects, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the API server 110, this server 110 receives and transmits message data (e.g., commands and message payloads) between the client device 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to the messaging server application 114, and for possible access by another messaging client application 104; the setting of a collection of media data (e.g., story); the retrieval of such collections; the retrieval of a list of friends of a user of a client device 102; the retrieval of messages and content; the adding and deleting of friends to a social graph; the location of friends within a social graph; access to user conversation data; access to avatar information stored on messaging server system 108; and opening an application event (e.g., relating to the messaging client application 104).

The application server 112 hosts a number of applications and subsystems, including a messaging server application 114, an image processing system 116, a social network system 122, and the data privacy system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114. A portion of the image processing system 116 may also be implemented by the data privacy system 124.

The social network system 122 supports various social networking functions and services and makes these functions and services available to the messaging server application 114. To this end, the social network system 122 maintains and accesses an entity graph within the database 120. Examples of functions and services supported by the social network system 122 include the identification of other users of the messaging system 100 with which a particular user has relationships or is "following" and also the identification of other entities and interests of a particular user. Such other users may be referred to as the user's friends. Social network system 122 may access location information associated with each of the user's friends to determine where they live or are currently located geographically. Social network system 122 may maintain a location profile for each of the user's friends indicating the geographical location where the user's friends live.

The application server 112 is communicatively coupled to a database server 118, which facilitates access to a database 120 in which is stored data associated with messages processed by the messaging server application 114. Database 120 may be a third-party database. For example, the application server 112 may be associated with a first entity and the database 120 or a portion of the database 120 may be associated and hosted by a second different entity. In some implementations, database 120 stores user data that the first entity collects about various each of the users of a service provided by the first entity. For example, the user data includes user names, passwords, addresses, friends, activity information, preferences, videos or content consumed by the user, and so forth. The data may be provided by the users voluntarily or may be collected automatically by the first entity and stored in database 120. In some implementations, the data is provided by the user for using a particular function of the service provided by the first entity. In some cases, this same data can be used by another new function or feature or service provided by the first entity. The user may or may not be interested in the new function or feature or service provided by the first entity and accordingly there may be restrictions on the way in which the user's data can be used without express permission by the user. These uses are typically controlled and regulated according to privacy regulations.

Figure 2:
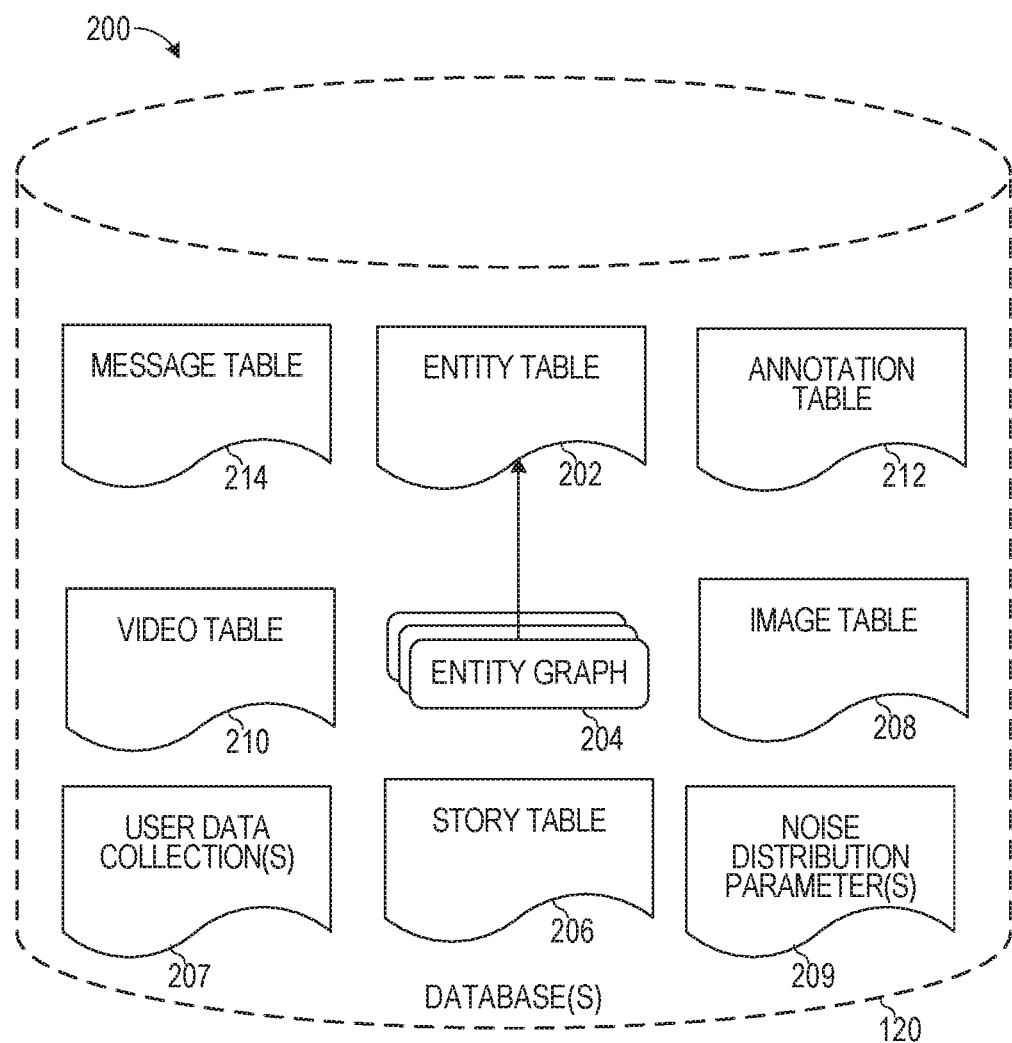
FIG. 2 is a schematic diagram illustrating data which may be stored in the database of a messaging server system, according to example embodiments.

FIG. 2 is a schematic diagram 200 illustrating data, which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 214. An entity table 202 stores entity data, including an entity graph 204. Entities for which records are maintained within the entity table 202 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 204 furthermore stores information regarding relationships and associations between entities. Such relationships may be social, professional (e.g., work at a common corporation or organization), interest-based, or activity-based, merely for example.

Message table 214 may store a collection of conversations between a user and one or more friends or entities. Message table 214 may include various attributes of each conversation, such as the list of participants, the size of the conversation (e.g., number of users and/or number of messages), the chat color of the conversation, a unique identifier for the conversation, and any other conversation-related feature(s).

The database 120 also stores annotation data, in the example form of filters, in an annotation table 212. Database 120 also stores annotated content received in the annotation table 212. Filters for which data is stored within the annotation table 212 are associated with and applied to videos (for which data is stored in a video table 210) and/or images (for which data is stored in an image table 208). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a UI by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include current temperature at a specific location, a current speed at which a sending user is traveling, battery life for a client device 102, or the current time.

Other annotation data that may be stored within the image table 208 is so-called "lens" data. A "lens" may be a real-time special effect and sound that may be added to an image or a video.

As mentioned above, the video table 210 stores video data which, in one embodiment, is associated with messages for which records are maintained within the message table 214. Similarly, the image table 208 stores image data associated with messages for which message data is stored in the entity table 202. The entity table 202 may associate various annotations from the annotation table 212 with various images and videos stored in the image table 208 and the video table 210.

User data collection(s) 207 stores previously collected data about a plurality of users of the application server 112. Such data includes any personal information supplied by the plurality of users and interaction data about the users. For example, the data represents which videos or content each of the users has watched or consumed and for how long the content was consumed. The data represents any one of avatar characteristics of each user, a current location of each user, demographic information about each user, a list of each user's friends on a social network system 122, each user's date of birth, credit card numbers, social security numbers, how often each user accesses the messaging client application 104, pictures and videos captured by one or more user devices of each user, and/or any combination thereof.

Noise distribution parameter(s) 209 stores a database that includes parameters and/or random data used by the data privacy system 124. For example, the noise distribution parameter(s) 209 stores a table shown in FIG. 8 that includes previously computed parameters of the noise distribution function (e.g., the Podium mechanism). Specifically, noise distribution parameter(s) 209 may store a table with a list of values corresponding to different privacy parameters E, distribution parameter d, spread A of the set of input data, width w of the two-step function, multiplicative margin m, and unconstrained parameter s. By storing these parameters that are pre-computed, the efficiency and speed at which random variables are generated by the noise distribution is enhanced.

A story table 206 stores data regarding collections of messages and associated image, video, or audio data, which are compiled into a collection (e.g., a story or a gallery). The creation of a particular collection may be initiated by a particular user (e.g., each user for which a record is maintained in the entity table 202). A user may create a "personal story" in the form of a collection of content that has been created and sent/broadcast by that user. To this end, the UI of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a UI of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 3:
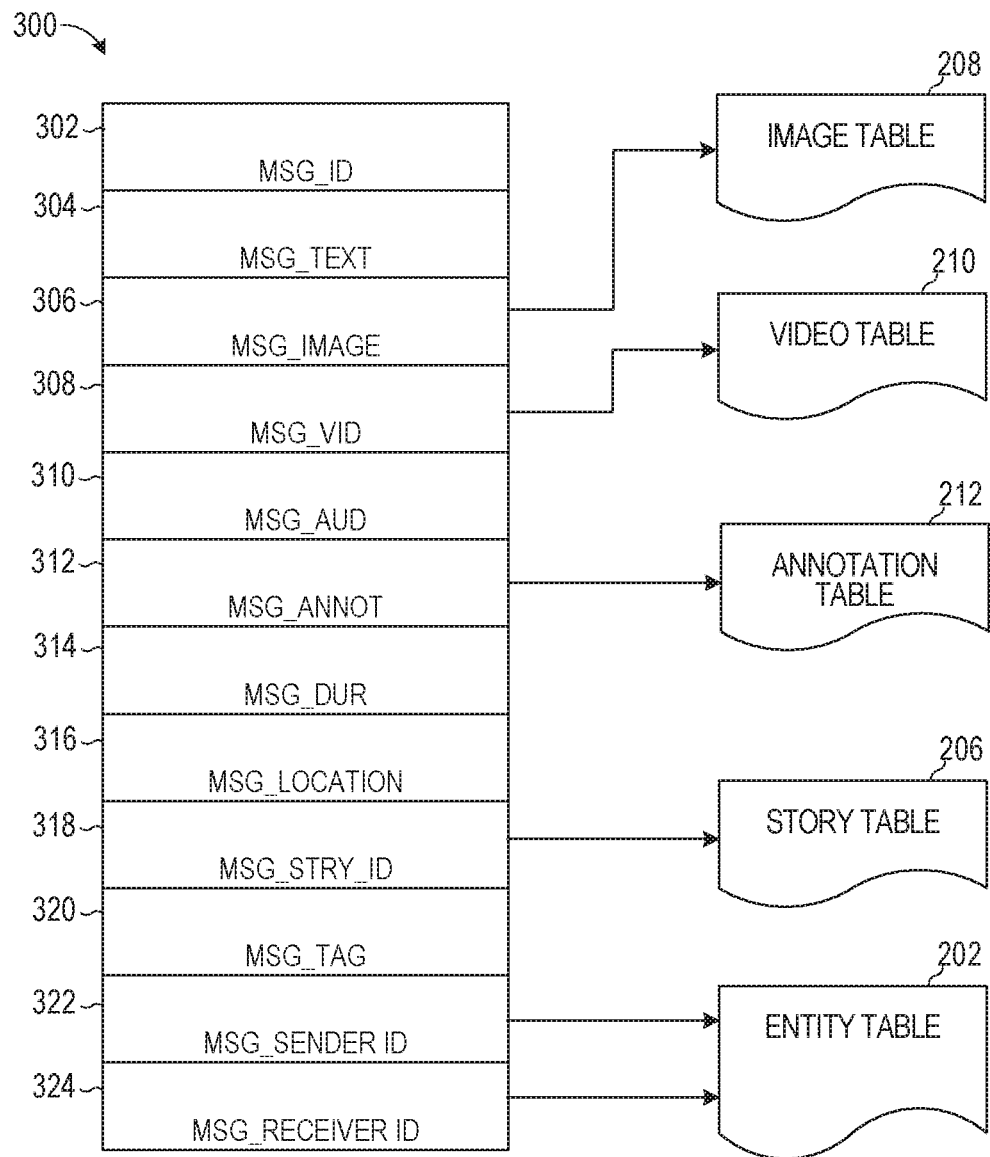
FIG. 3 is a schematic diagram illustrating a structure of a message generated by a messaging client application for communication, according to example embodiments.

FIG. 3 is a schematic diagram illustrating a structure of a message 300, according to some embodiments, generated by a messaging client application 104 for communication to a further messaging client application 104 or the messaging server application 114. The content of a particular message 300 is used to populate the message table 214 stored within the database 120, accessible by the messaging server application 114. Similarly, the content of a message 300 is stored in memory as "in-transit" or "in-flight" data of the client device 102 or the application server 112. The message 300 is shown to include the following components:

A message identifier 302: a unique identifier that identifies the message 300.

A message text payload 304: text, to be generated by a user via a UI of the client device 102 and that is included in the message 300.

A message image payload 306: image data, captured by a camera component of a client device 102 or retrieved from memory of a client device 102, and that is included in the message 300.

A message video payload 308: video data, captured by a camera component or retrieved from a memory component of the client device 102 and that is included in the message 300.

A message audio payload 310: audio data, captured by a microphone or retrieved from the memory component of the client device 102, and that is included in the message 300.

Message annotations 312: annotation data (e.g., filters, stickers, or other enhancements) that represents annotations to be applied to message image payload 306, message video payload 308, or message audio payload 310 of the message 300.

A message duration parameter 314: parameter value indicating, in seconds, the amount of time for which content of the message (e.g., the message image payload 306, message video payload 308, message audio payload 310) is to be presented or made accessible to a user via the messaging client application 104.

A message geolocation parameter 316: geolocation data (e.g., latitudinal and longitudinal coordinates) associated with the content payload of the message. Multiple message geolocation parameter 316 values may be included in the payload, with each of these parameter values being associated with respect to content items included in the content (e.g., a specific image within the message image payload 306, or a specific video in the message video payload 308).

A message story identifier 318: identifier value identifying one or more content collections (e.g., "stories") with which a particular content item in the message image payload 306 of the message 300 is associated. For example, multiple images within the message image payload 306 may each be associated with multiple content collections using identifier values.

A message tag 320: each message 300 may be tagged with multiple tags, each of which is indicative of the subject matter of content included in the message payload. For example, where a particular image included in the message image payload 306 depicts an animal (e.g., a lion), a tag value may be included within the message tag 320 that is indicative of the relevant animal. Tag values may be generated manually, based on user input, or may be automatically generated using, for example, image recognition.

A message sender identifier 322: an identifier (e.g., a messaging system identifier, email address, or device identifier) indicative of a user of the client device 102 on which the message 300 was generated and from which the message 300 was sent.

A message receiver identifier 324: an identifier (e.g., a messaging system identifier, email address, or device identifier) indicative of user(s) of the client device 102 to which the message 300 is addressed. In the case of a conversation between multiple users, the identifier may indicate each user involved in the conversation.

The contents (e.g., values) of the various components of message 300 may be pointers to locations in tables within which content data values are stored. For example, an image value in the message image payload 306 may be a pointer to (or address of) a location within an image table 208. Similarly, values within the message video payload 308 may point to data stored within a video table 210, values stored within the message annotations 312 may point to data stored in an annotation table 212, values stored within the message story identifier 318 may point to data stored in a story table 206, and values stored within the message sender identifier 322 and the message receiver identifier 324 may point to user records stored within an entity table 202.

Figure 4:
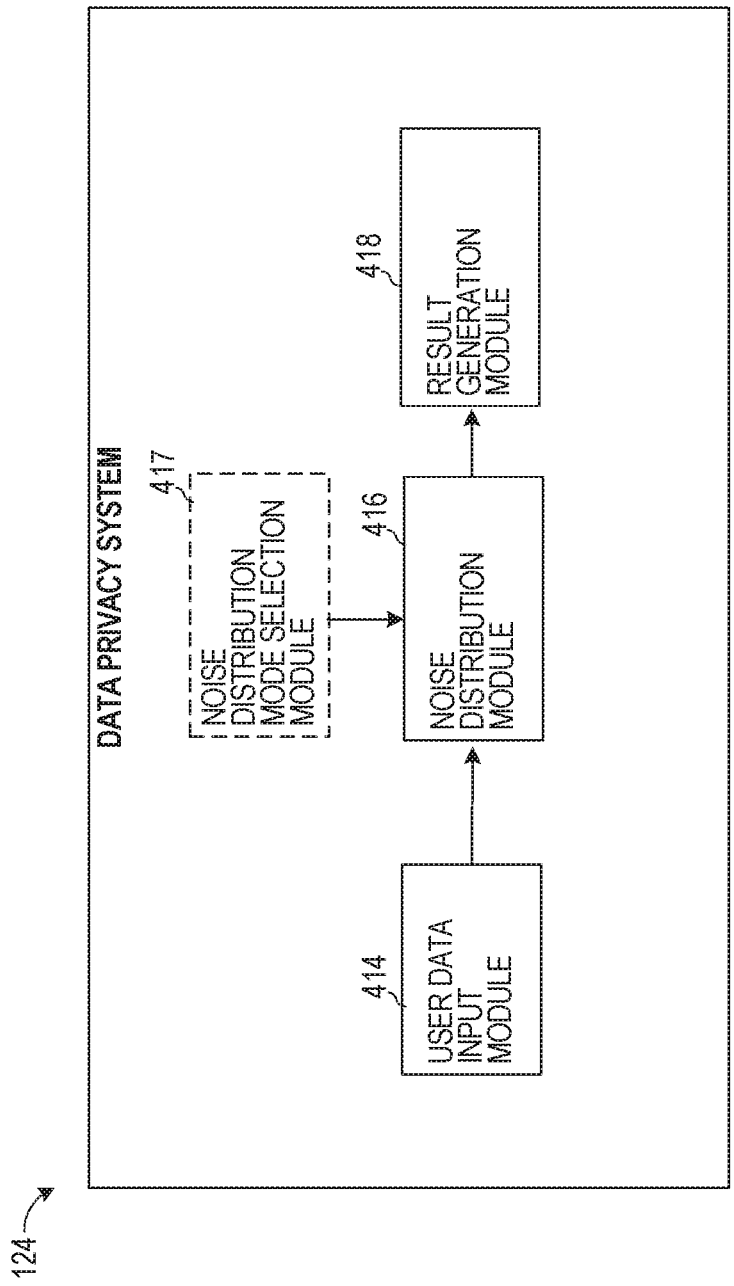
FIG. 4 is a block diagram showing an example data privacy system, according to example embodiments.

FIG. 4 is a block diagram showing an example data privacy system 124, according to example embodiments. Data privacy system 124 includes a user data input module 414, a noise distribution module 416, a noise distribution mode selection module 417, and a result generation module 418.

User data input module 414 communicates with user data collection(s) 207 and/or data privacy application 105. The user data input module 414 provides a set of input data to the noise distribution module 416 to add noise or random values to the set of input data. The user data input module 414 also provides a request for access or statistical analysis of the set of input data as received from the data privacy application 105. Rather than responding to the request with the actual real information using only the set of input data, the result generation module 418 responds to requests from the data privacy application 105 using additional data that is generated using the noise distribution module 416.

Noise distribution module 416 implements a Podium mechanism to generate random values based on the set of input data received from the user data input module 414. Let X be a continuous random variable to be collected from a local privacy model given a privacy budget or parameter $\in$. Let M be a randomized mechanism (e.g., the Podium mechanism) that adds zero-mean noise with variance $\sigma^2$ to each raw data point x. Let x'=M(x) be the observed, noisy data points satisfying the differential privacy property. In such cases, the randomized mechanism M satisfies differential privacy if for all inputs $x_i$ and $x_j$ and all outputs x', $P(M(x_i)=x') \le e^\epsilon P(M(x_j)=x')$.

Sensitivity of the data collection (or the spread of the data), $\Delta$ can be defined a priori to the data collection as $$\Delta = \max_{x_i, x_j} \|x_i - x_j\|_1.$$

Figure 6:
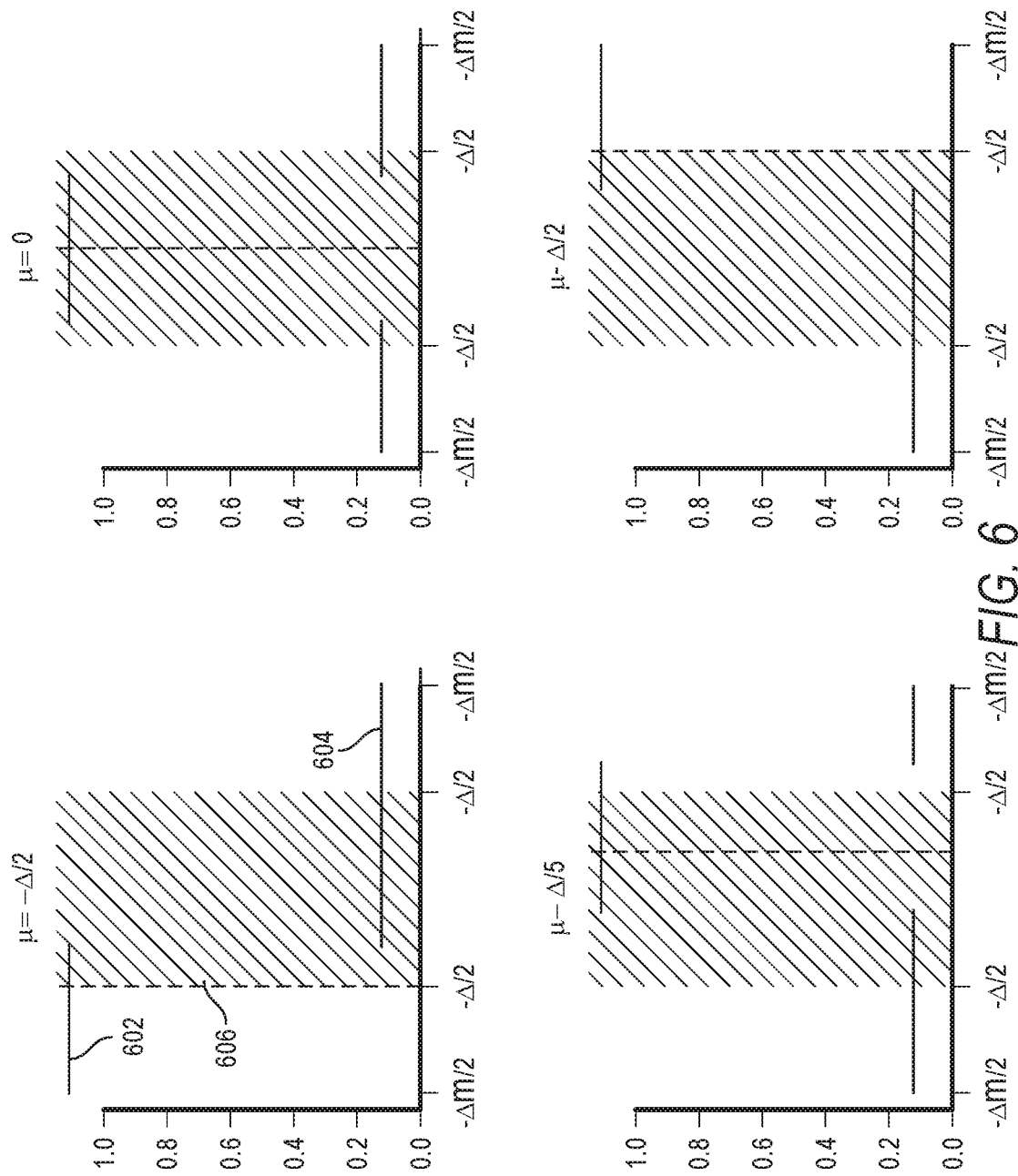
FIGS. 6-7 are illustrative inputs and outputs of the data privacy system, according to example embodiments.

The Podium mechanism is implemented as a two-step function where the height of the step is determined by the privacy parameter, the width of the step is determined by minimizing the variance of the distribution and its location is dictated by the input value x or its mean. FIG. 6 shows four illustrative distributions for different values of x. Specifically, FIG. 6 shows the Podium mechanism for $\Delta=1$ and $E=\log(9)$ for different input values x (different means). The step shifts from left ($\Delta m/2$) to right ($\Delta m/2$) taking on different shapes for values in between. The shaded region highlights the range of input values. The support of the distribution is defined by the margin m and sensitivity $\Delta$. In this case m=2.102601 and the width w=0.7540498. The horizontal lines 602 and 604 represent the probability of random values that are generated by the noise distribution and the vertical line 606 represents a mean of the values corresponding to the horizontal lines 602 and 604.

Besides the privacy parameter and the sensitivity of the data collection, the Podium distribution includes three additional parameters, m, w, and t. The first one, m, is a multiplicative margin on A describing the support of the distribution. In some embodiments, this parameter is generated to have the smallest possible m (i.e. m=1) to allow the noise distribution to match the range of input and output values. For example, if the input data includes age, spread from 13 to 120 ($\Delta=107$), the noise distribution is designed to output the corresponding noisy values in the same range. This parameter depends only on the privacy parameter and is determined by minimizing the variance of the Podium distribution.

The second parameter w describes the width of the step. Its value also comes from the variance optimization. It depends on privacy parameter and $\Delta$ and can be pre-computed once. The third parameter t describes the location of the step under the constraint that the mean ($\mu$) of the Podium distribution is equal the input value x. This parameter t ranges between $\Delta m/2$ and $\Delta m/2$. Since it changes depending on x, it is computed every time during the collection process (e.g., whenever a request for data is received from a client device 102). In an implementation, to avoid a constrained optimization, t is parameterized using another unconstrained parameter s in accordance with the following equation:

$$t = \frac{\Delta m}{1+e^{-s}} - \frac{\Delta m}{2},$$

which translates a real value s into an interval [−Δm/2, Δm/2].

Figure 7:
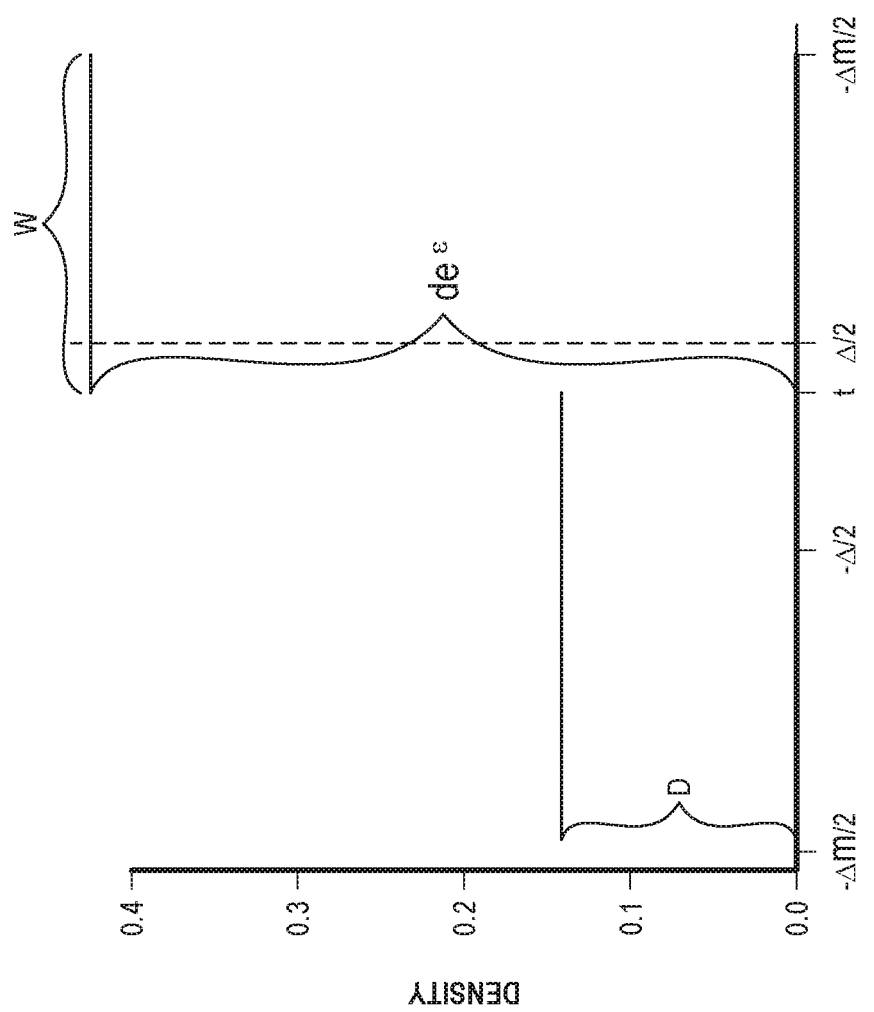

In some embodiments, to derive the shape of the noise distribution of the Podium distribution, the noise distribution module 416 minimizes its variance. The noise distribution module 416 changes the shape and variance of the distribution, depending on its mean. The noise distribution module 416 performs such minimization under the constraint that its mean is equal to Δ/2 or at its most extreme shape. The noise distribution module 416 allocates a margin m to balance the distribution. The noise distribution is a shape where the second parameter w becomes a function of t, as the distribution becomes a mixture of two uniform variables instead of three. This distribution is shown schematically in FIG. 7. The density shown in FIG. 7 represents a likelihood of a value being generated from the corresponding horizontal lines. The ratio of the two horizontal lines is set to be a function of the privacy parameter (e.g., $e^\varepsilon$).

The noise distribution module 416 performs variance optimization calculations at the extreme right shape of the Podium distribution and has two unknowns (m and s) and two constraints. The first constraint is that $\mu = \Delta/2$ and the second constraint is that the area under the Podium function adds up to one to be a proper distribution. Because it is a two-component mixture distribution with mean $\mu$, its variance can be computed in accordance with:

$$\begin{aligned} V(Z) &= E[(Z-\mu)^2] \\ &= \sum_{i=1}^{K} p_i(\mu_i^2 + \sigma_i^2) - \mu^2 \\ &= p(\mu_1^2 + \sigma_1^2) + (1-p)(\mu_2^2 + \sigma_2^2) - (\Delta/2)^2, \end{aligned}$$

where p is the proportion of the first component, μ1 and μ2 are the means of each component and σ2 and σ2 are their corresponding variances.

First, noise distribution module 416 computes the probability of the first component p which turns out to be a function of the differential parameter ∈ and s only. Let d be the density (height) of the first component. To guarantee ∈-differential privacy, the second component must be equal $de^\in$. In such circumstances, p can be computed in accordance with:

$$p = \left(\frac{\Delta m}{1+e^{-s}} - \frac{\Delta m}{2} + \frac{\Delta m}{2}\right)d = \frac{\Delta m d}{1+e^{-s}}.$$

The noise distribution module 416 can reduce this equation to determine that:

$$1-p = \frac{\Delta m d e^\varepsilon}{1+e^s}.$$

Further, because these must add up to 1 to produce a proper density function, the noise distribution module 416 solves for d in accordance with:

$$d = \frac{(1+e^{-s})(1+e^s)}{\Delta m(1+e^s+e^\varepsilon+e^{\varepsilon-s})}.$$

Plugging d into the first component probability results in the equation:

$$p = \frac{1+e^s}{1+e^s+e^\varepsilon+e^{\varepsilon-s}},$$

which does not depend on m or the range of the input data. Since each component is simply a uniform random variable on an interval [a, b], its mean is given by (a+b)/2 and variance by (b−a)^2/12. Thus, the mean of the first component is given by:

$$\mu_1 = -\frac{\Delta m}{2}\left(\frac{1}{1+e^s}\right)$$

and the mean of the second component is given by:

$$\mu_2 = \frac{\Delta m}{2}\left(\frac{1}{1+e^{-s}}\right).$$

Their variances can be computed in accordance with:

$$\sigma_1^2 = \frac{\Delta^2 m^2}{12}\left(\frac{1}{1+e^{-s}}\right)^2$$

$$\sigma_2^2 = \frac{\Delta^2 m^2}{12}\left(\frac{1}{1+e^s}\right)^2,$$

The second constraint can be considered to be that the mean of this distribution is equal to equal to Δ/2 which implies that:

$$\begin{aligned} \mu &= p\mu_1 + (1-p)\mu_2 \\ &= -\frac{\Delta m}{2(1+e^s+e^\varepsilon+e^{\varepsilon-s})} + \frac{\Delta m e^\varepsilon}{2(1+e^s+e^\varepsilon+e^{\varepsilon-s})} \\ &= \frac{\Delta}{2} \end{aligned}$$

and noise distribution module 416 computes m in accordance with:

$$m = \frac{1+e^s+e^\varepsilon+e^{\varepsilon-s}}{e^\varepsilon - 1}.$$

Plugging individual pieces into the total variance formula above, after combining and rearranging terms results in:

$$V(Z) = \frac{\Delta^2(1 + e^s + e^\epsilon + e^{-s})}{12(e^\epsilon - 1)^2}\left(\frac{3 + e^{\epsilon-s} + e^s(e^s + 3e^\epsilon)}{1 + e^s}\right) - \frac{\Delta^2}{4}.$$

and taking the first derivative results in:

$$\frac{dV(Z)}{ds} = -2e^{\epsilon-s} + 2e^{s+\epsilon} - e^{2\epsilon-2s} + e^{2s},$$

which is a quartic function ($4^{th}$ degree polynomial) in s. Setting $$\frac{dV(Z)}{ds}$$

equal to 0 and solving for s allows s to be computed in accordance with Equation 1:

$$s = \begin{cases} \log\left(\frac{-\sqrt{A + e^{2\epsilon}} - e^\epsilon + \sqrt{-B + 2e^{2\epsilon} - A}}{2}\right) & \epsilon \geq \log(\sqrt{2}) \\ \log\left(\frac{\sqrt{A + e^{2\epsilon}} - e^\epsilon + \sqrt{B + 2e^{2\epsilon} - A}}{2}\right) & \epsilon < \log(\sqrt{2}) \end{cases} \quad (1)$$

where and $$A = (4(e^{2\epsilon} - e^{4\epsilon}))^{\frac{1}{3}}$$

and $$B = \frac{2(2e^\epsilon - e^{3\epsilon})}{\sqrt{A + e^{2\epsilon}}}.$$

The second derivative is given by $$\frac{d^2V(Z)}{ds^2} = 4e^\epsilon(\cosh(2s - \epsilon) + \cosh(s))$$

and is always positive as the domain of cos h(x) is >=1. This means that the solution is a true global minimum. The value for s can be closely approximated by s=ϵ/3 which does not affect the privacy of the Podium mechanism and only affects its relative efficiency.

The noise distribution module 416 computes the width parameter w in accordance with:

$$w = \frac{\Delta m}{2} - t$$
$$= \frac{\Delta m}{2} - \left(\frac{\Delta m}{1 + \epsilon^{-s}} - \frac{\Delta m}{2}\right)$$
$$= \Delta m\left(1 - \frac{1}{1 + e^{-s}}\right)$$
$$= \frac{\Delta m}{1 - e^s}.$$

where both m and s are agnostic to the sensitivity or the input data spread while w is linearly proportional to the spread.

The noise distribution module 416 can be configured in one of a plurality of modes to generate a noise distribution. The modes include an exact mode in which the value of s is exactly computed and an approximation mode in which the value of s is approximated. The mode is selected by the noise distribution mode selection module 417.

To generate a random variable from the noise distribution module 416 given the collection parameters ∈ and Δ, noise distribution module 416 can pre-compute m, w and d. This can be done once prior to the start of the collection process. For example, if the noise distribution mode selection module 417 selects the exact mode, the value of s can be computed in accordance with Equation 1 or may be retrieved from a previously stored table of values shown in FIG. 8.

If the noise distribution mode selection module 417 selects the approximation mode, the value of s is computed by noise distribution module 416 to be s=ϵ/3. In both modes the noise distribution module 416 computes the remaining parameters as follows and stores them in noise distribution parameter(s) 209:

$$m = \frac{1 + e^s + e^\epsilon + e^{\epsilon-s}}{e^\epsilon - 1}$$

$$w = \frac{\Delta m}{1 + e^s}$$

$$d = \frac{(1 + e^{-s})(1 + e^s)}{\Delta m(1 + e^s + e^\epsilon + e^{\epsilon-s})}$$

Result generation module 418 uses the noise distribution generated by noise distribution module 416 to add noise (e.g., Podium noise) to a set of requested data. In some embodiments, result generation module 418 performs a process (described below) on every noise addition since the shape of the distribution depends on the input value x. The only shape parameter that changes is t, the location of the step. After computing t, the result generation module 418 selects a random one of the three mixture components by generating a standard uniform random variable and then selects randomly from the selected component with the help of another uniform random variable.

In some embodiments, the result generation module 418 receives as input the privacy parameter ∈, the range of the set of data Δ, the parameters m, w, d and x. X may be a value provided by a client device 102 using the data privacy application 105. The result generation module 418 computes t in accordance with:

$$t = \frac{2x - w^2 d(e^\epsilon - 1)}{2wd(e^\epsilon - 1)}.$$

The result generation module 418 computes a probability of a first component $p_1$ and probability of a second component $p_2$ in accordance with:

$$p_1 = d\left(t + \frac{\Delta m}{2}\right)$$
$$p_2 = de^\epsilon w.$$

$$p_2 = de^\epsilon w.$$

The result generation module 418 generates a uniform random variable Y in [0,1]. The result generation module 418 determines whether Y is less than the probability of the first component $p_1$. If so, the result generation module 418 returns to the privacy application 105 a uniform random variable $X_1$ in $$\left[-\frac{\Delta m}{2}, t\right].$$

If Y is not less than the probability of a first component $p_1$, the result generation module 418 determines whether Y is less than the sum of the probability of the first component $p_1$ and the probability of the second component $p_2$. If so, the result generation module 418 returns to the privacy application 105 a uniform random variable $X_2$ in [t, t+w). If the result generation module 418 determines that Y is not less than the sum of the probability of the first component $p_1$ and the probability of the second component $p_2$, the result generation module 418 returns to the privacy application 105 a uniform random variable $X_3$ in $$\left[t+w, \frac{\Delta m}{2}\right].$$

The noise distribution provided by the noise distribution module 416 provides a differential privacy in accordance with:

$$e^{-\epsilon} \leq \frac{P(P(x_i) = x')}{P(P(x_j) = x')} \leq e^{\epsilon}.$$

The variance when $\mu=0$ of the noise distribution is computed in accordance with:

$$V_{PM}^{\mu=0} = \frac{d}{12}(\Delta^3 m^3 + w^3(e^{\epsilon} - 1))$$

$$= \frac{\Delta^2 m^2}{12} \frac{(1+e^{-s})(1+e^s)}{1+e^s+e^{\epsilon}+e^{\epsilon-s}}$$

$$= \frac{\Delta^2}{12} \frac{(1+e^s+e^{\epsilon}+e^{\epsilon-s})(1+e^{-s})(1+e^s)}{(e^{\epsilon}-1)^2}$$

The distribution takes on the largest variance in case of the most off-center location of the step (e.g., when a large portion of the mass is in one of the tails its mean is equal to $$-\frac{\Delta}{2} \text{ or } \frac{\Delta}{2}\right)$$

and in such cases the variance is computed in accordance with:

$$V_{PM}^{\mu=\Delta/2} = \frac{\Delta^2 m^2}{12} \times \frac{1}{1+e^s+e^{\epsilon}+e^{\epsilon-s}} \times$$

$$\frac{3+e^{\epsilon-s}+e^s(e^s+3e^{\epsilon})}{1+e^s} - \frac{\Delta^2}{4}$$

$$= \frac{\Delta^2}{12} \frac{\cosh(2s-e) + 4\cosh(s) + 3}{\cosh(\epsilon) - 1}$$

In a high-privacy regime (e.g., ($\epsilon \to 0$)), the step width w is equal to $\Delta m$ (e.g., the Podium distribution becomes equivalent to the uniform distribution on the interval $$\left[-\frac{\Delta m}{2}, \frac{\Delta m}{2}\right].$$

In such cases, the variance is equal to $$V_{PM}^{\epsilon=0} = \frac{\Delta^2 m^2}{12}$$

which represents perfect privacy. In low-privacy regime ($\epsilon \to \infty$), the Podium mechanism has a variance that is in the extreme right shape equal to:

$$V_{PM}^{\epsilon \to \infty} = \Theta\left(\Delta^2 e^{-\frac{2}{3}\epsilon}\right).$$

This makes the Podium mechanism exponentially more efficient than the prior technique using the Laplace mechanism in the low-privacy regime.

Figure 5:
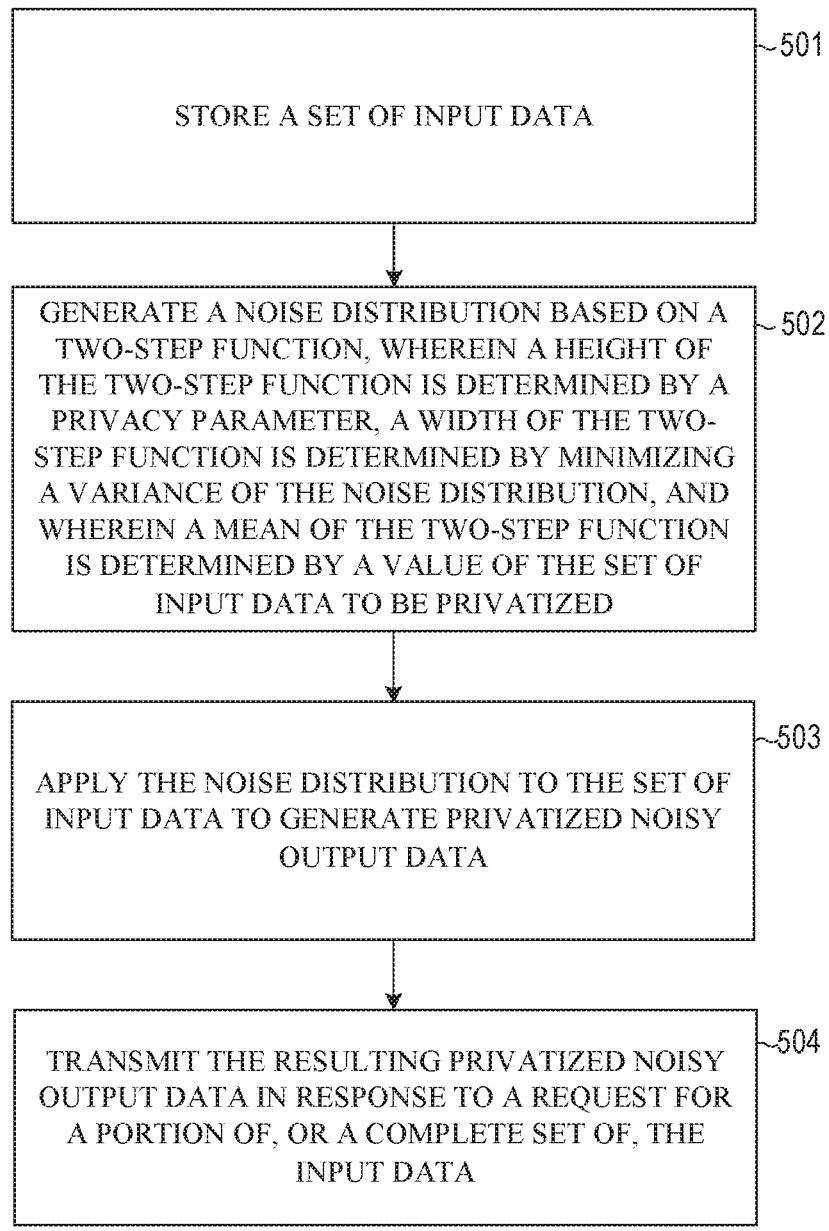
FIG. 5 is a flowchart illustrating example operations of the data privacy system, according to example embodiments.

FIG. 5 is a flowchart illustrating example operations of the data privacy system 124 in performing process 500, according to example embodiments. The process 500 may be embodied in computer-readable instructions for execution by one or more processors such that the operations of the process 500 may be performed in part or in whole by the functional components of the messaging server system 108 and/or data privacy application 105; accordingly, the process 500 is described below by way of example with reference thereto. However, in other embodiments, at least some of the operations of the process 500 may be deployed on various other hardware configurations. The process 500 is therefore not intended to be limited to the messaging server system 108 and can be implemented in whole, or in part, by any other component. Some or all of the operations of process 500 can be in parallel, out of order, or entirely omitted.

At operation 501, the data privacy system 124 stores a set of input data.

At operation 502, the data privacy system 124 generates a noise distribution based on a two-step function, wherein a height of the two-step function is determined by a privacy parameter, a width of the two-step function is determined by minimizing a variance of the noise distribution, and wherein a mean of the two-step function is determined by a value of the set of input data to be privatized.

At operation 503, the data privacy system 124 applies the noise distribution to the set of input data to generate privatized noisy output data.

At operation 504, the data privacy system 124 transmits the resulting privatized noisy output data in response to a request for a portion of, or a complete set of, the input data.

Figure 8:
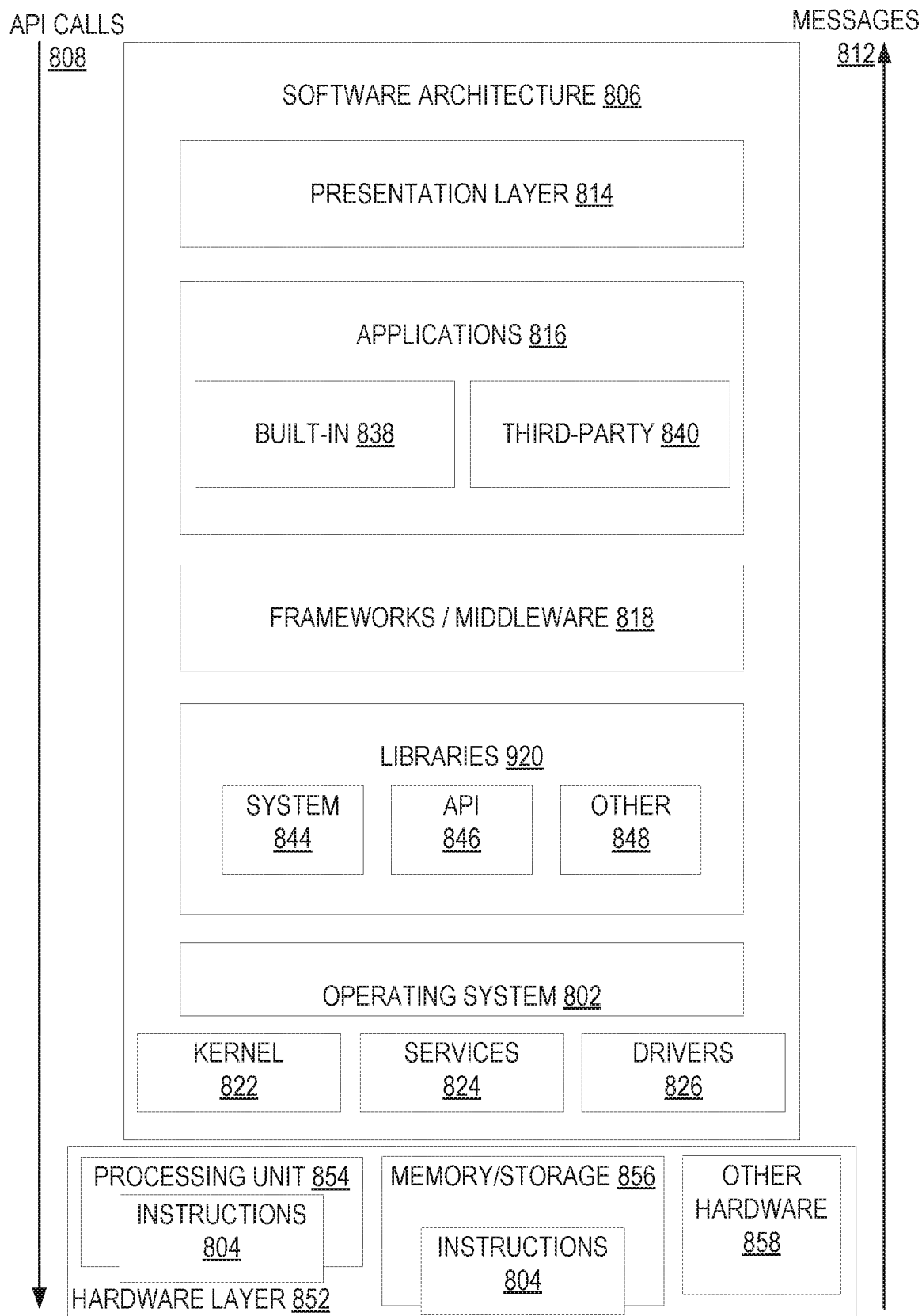
FIG. 8 is a block diagram illustrating a representative software architecture, which may be used in conjunction with various hardware architectures herein described, according to example embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and input/output (I/O) components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke API calls 808 through the software stack and receive messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers. Bluetooth® drivers, flash memory drivers, serial communication drivers (e.g., Universal Serial Bus (USB) drivers). Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR, JPG, PNG), graphics libraries (e.g., an OpenGL framework that may be used to render two-dimensional and three-dimensional in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic UI (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built-in operating system functions (e.g., kernel 822, services 824, and/or drivers 826), libraries 820, and frameworks/middleware 818 to create UIs to interact with users of the system. Alternatively. or additionally, in some systems, interactions with a user may occur through a presentation layer, such as presentation layer 814. In these systems, the application/component "logic" can be separated from the aspects of the application/component that interact with a user.

Figure 9:
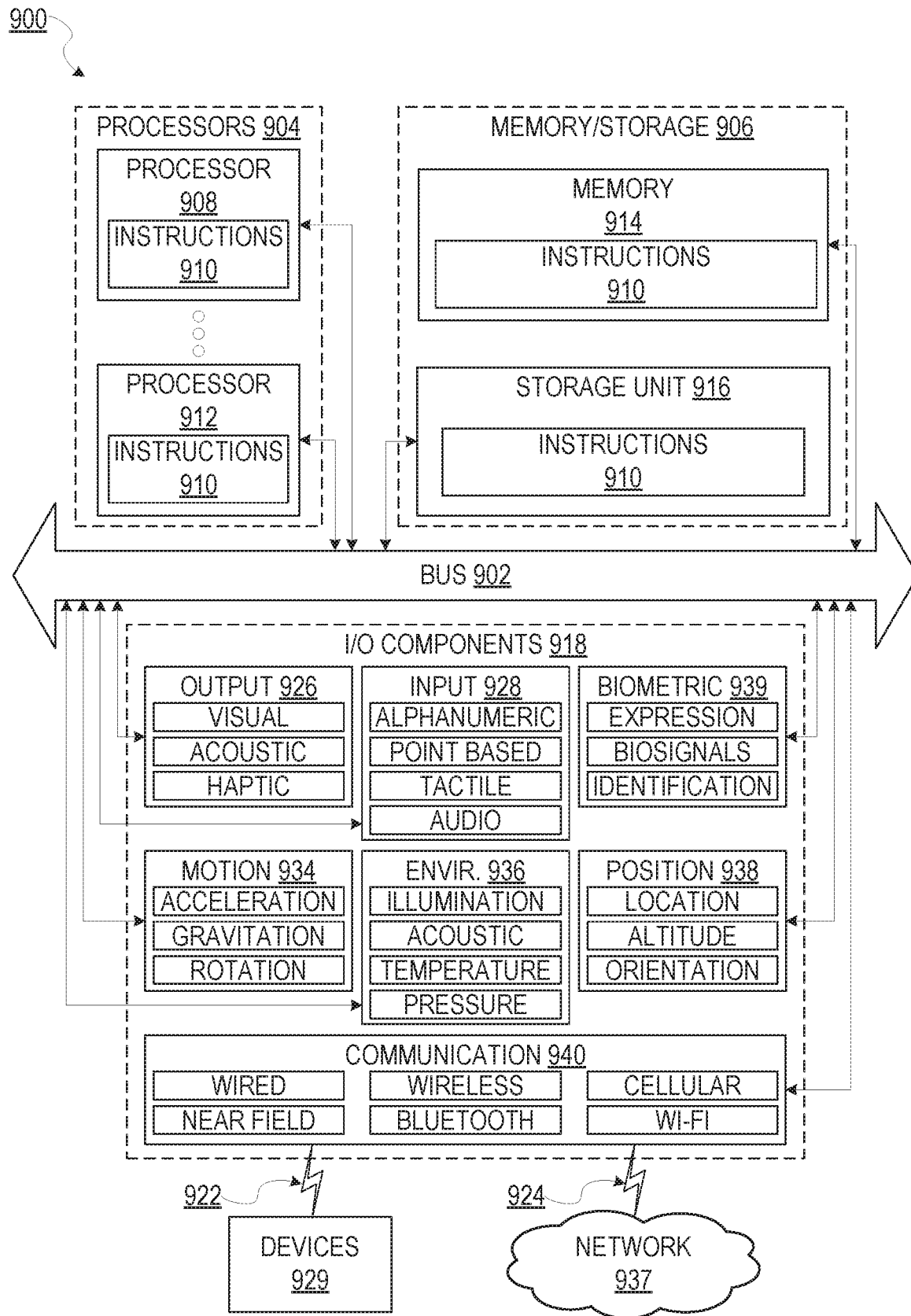
FIG. 9 is a block diagram illustrating components of a machine able to read instructions from a machine-readable medium (e.g., a machine-readable storage medium) and perform any one or more of the methodologies discussed herein, according to example embodiments.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. In an example embodiment, the processors 904 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 908 and a processor 912 that may execute the instructions 910. The term "processor" is intended to include multi-core processors 904 that may comprise two or more independent processors (sometimes referred to as "cores") that may execute instructions contemporaneously. Although FIG. 9 shows multiple processors 904, the machine 900 may include a single processor with a single core, a single processor with multiple cores (e.g., a multi-core processor), multiple processors with a single core, multiple processors with multiple cores, or any combination thereof.

The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 939, motion components 934, environmental components 936, or position components 938 among a wide array of other components. For example, the biometric components 939 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 937 or devices 929 via coupling 924 and coupling 922, respectively. For example, the communication components 940 may include a network interface component or other suitable device to interface with the network 937. In further examples, communication components 940 may include wired communication components, wireless communication components, cellular communication components. Near Field Communication (NFC) components. Bluetooth® components (e.g., Bluetooth® Low Energy), Wi-Fi® components, and other communication components to provide communication via other modalities. The devices 929 may be another machine or any of a wide variety of peripheral devices (e.g., a peripheral device coupled via a USB).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code. Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying transitory or non-transitory instructions for execution by the machine, and includes digital or analog communications signals or other intangible medium to facilitate communication of such instructions. Instructions may be transmitted or received over the network using a transitory or non-transitory transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop. PDAs, smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT). Evolution-Data Optimized (EVDO) technology, General Packet Radio Service (GPRS) technology. Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EPHEMERAL MESSAGE" in this context refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device, or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points. APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code.", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   storing, by one or more processors, a set of input data;
   generating, by the one or more processors, a noise distribution based on a two-step function, a height of the two-step function being determined by a privacy parameter, a width w of the two-step function being determined by minimizing a variance of the noise distribution, and a mean of the two-step function being determined by a value of the set of input data to be privatized, wherein generating the noise distribution comprises:
   computing a multiplicative margin m of a spread A of the set of input data;
   computing the width w of the two-step function as a function of the spread of the set of input data, the multiplicative margin m and an unconstrained parameter s; and
   computing a distribution parameter d as a function of the spread of the set of input data, the multiplicative margin m, the unconstrained parameter s, and the privacy parameter;
   receiving, from a messaging application, a request to access the set of input data;
   in response to receiving the request to access the set of input data, applying, by the one or more processors, the noise distribution to the set of input data to generate privatized noisy output data to prevent exposure to particular data points representing user information in the set of input data, the privatized noisy output data comprises random data added to the set of input data; and
   transmitting, by the one or more processors to the messaging application, the privatized noisy output data in response to the request.

2. The method of claim 1 further comprising selecting a mode from a plurality of modes of the noise distribution.

3. The method of claim 2, wherein the plurality of modes includes an exact mode and an approximation mode.

4. The method of claim 3 further comprising:
   determining that the selected mode corresponds to the exact mode; and
   retrieving, when the selected mode corresponds to the exact mode, a previously stored unconstrained parameter s of the noise distribution, the previously stored unconstrained parameter being previously computed based on the privacy parameter.

5. The method of claim 3 further comprising:
determining that the selected mode corresponds to the approximation mode; and
computing, when the selected mode corresponds to the approximation mode, an unconstrained parameter s of the noise distribution as a fraction of the privacy parameter.

6. The method of claim 1, wherein the multiplicative margin m is computed in accordance with:

$$m = \frac{1 + e^s + e^\epsilon + e^{\epsilon-s}}{e^\epsilon - 1}$$

where ε is the privacy parameter, and wherein e is an exponential function.

7. The method of claim 6, wherein the width w is computed in accordance with:

$$w = \frac{\Delta m}{1 + e^s}.$$

8. The method of claim 7, wherein the distribution parameter d is computed in accordance with:

$$d = \frac{(1 + e^{-s})(1 + e^s)}{\Delta m(1 + e^s + e^\epsilon + e^{\epsilon-s})}.$$

9. The method of claim 1 further comprising:
receiving a request for a given data x of the set of input data;
computing a location t of the two-step function based on the given data x, the width w, the distribution parameter d, and the privacy parameter;
computing probability of a first component $p_1$ as a function of the distribution parameter d, the location, the spread of the set of input data, and the multiplicative margin m; and
computing probability of a second component $p_2$ as a function of the distribution parameter d, the width w, and the privacy parameter.

10. The method of claim 9, wherein the location t is computed in accordance with:

$$t = \frac{2x - w^2 d(e^\epsilon - 1)}{2wd(e^\epsilon - 1)}$$

where x is the input value, and e is an exponential function.

11. The method of claim 10, wherein the probability of a first component $p_1$ is computed in accordance with:

$$p_1 = d\left(t + \frac{\Delta m}{2}\right).$$

12. The method of claim 9, wherein the probability of a second component $p_2$ is computed in accordance with:

$$p_2 = de^\epsilon w$$

where e is an exponential function.

13. The method of claim 9 further comprising:
in response to generating the privatized noisy output data, selecting from which component of the two-step function to draw noise by generating a uniform random variable and determining which component the random variable lies in;
if the first component is randomly selected with the probability $p_1$, computing the privatized noisy output data result as a first uniform random variable in a range defined as $$\left[-\frac{\Delta m}{2}, t\right],$$

where t is a location of the two-step function;
if the second component is randomly selected with a probability $p_2$, computing the privatized noisy output data result as a second uniform random variable in a range defined as [t, t+w); and
otherwise; computing the privatized noisy output data result as a third uniform random variable in a range defined as $$\left[t + w, \frac{\Delta 2}{2}\right].$$

14. A system comprising:
a processor; and
a memory storing instructions that, when executed by the processor, configure the processor to perform operations comprising:
storing a set of input data;
generating a noise distribution based on a two-step function, a height of the two-step function being determined by a privacy parameter, a width w of the two-step function being determined by minimizing a variance of the noise distribution, and a mean of the two-step function being determined by a value of the set of input data to be privatized, wherein generating the noise distribution comprises:
computing a multiplicative margin in of a spread A of the set of input data;
computing the width w of the two-step function as a function of the spread of the set of input data, the multiplicative margin m and an unconstrained parameter s; and
computing a distribution parameter d as a function of the spread of the set of inp data, the multiplicative margin m the unconstrained parameter s and the privacy parameter;
receiving, from a messaging application, a request to access the set of input data;
in response to receiving the request to access the set of input data, applying the noise distribution to the set of input data to generate privatized noisy output data to prevent exposure to particular data points representing user information in the set of input data, the privatized noisy output data comprises random data added to the set of input data; and
transmitting to the messaging application, the privatized noisy output data in response to the request.

15. The system of claim 14, wherein the operations further comprise selecting a mode from a plurality of modes of the noise distribution.

16. The system of claim 15, wherein the plurality of modes includes an exact mode and an approximation mode.

17. The system of claim 16, wherein the operations further comprise:
    determining that the selected mode corresponds to the exact mode; and
    retrieving, when the selected mode corresponds to the exact mode, a previously stored unconstrained parameter s of the noise distribution, the previously stored parameter being previously computed based on the privacy parameter.

18. The system of claim 16, wherein the operations further comprise:
    determining that the selected mode corresponds to the approximation mode; and
    computing, when the selected mode corresponds to the approximation mode, an unconstrained parameter s of the noise distribution as a fraction of the privacy parameter.

19. The system of claim 14, wherein the operations further comprise:
    receiving a request for a given data x of the set of input data;
    computing a location of the two-step function based on the given data x, the width w, the distribution parameter d and the privacy parameter;
    computing probability of a first component $p_1$ as a function of the distribution parameter d, the location, the spread of the set of input data, and the multiplicative margin m; and
    computing probability of a second component $p_2$ as a function of the distribution parameter d, the width w, and the privacy parameter.

20. A non-transitory machine-readable storage medium that includes instructions that, when executed by one or more processors of a machine, cause the machine to perform operations comprising:
    storing a set of input data;
    generating a noise distribution based on a two-step function, a height of the two-step function being determined by a privacy parameter, a width w of the two-step function being determined by minimizing a variance of the noise distribution, and a mean of the two-step function being determined by a value of the set of input data to be privatized, wherein generating the noise distribution comprises:
        computing a multiplicative margin m of a spread $\Delta$ of the set of input data;
        computing the width w of the two-step function as a function of the spread of the set of input data, the multiplicative margin m and an unconstrained parameter s; and
        computing a distribution parameter d as a function of the spread of the set of input data, the multiplicative margin m, the unconstrained parameter s, and the privacy parameter;
    receiving, from a messaging application, a request to access the set of input data;
    in response to receiving the request to access the set of input data, applying the noise distribution to the set of input data to generate privatized noisy output data to prevent exposure to particular data points representing user information in the set of input data, the privatized noisy output data comprises random data added to the set of input data; and
    transmitting to the messaging application, the privatized noisy output data in response to the request.

* * * * *

UNITED STATES PATENT AND TRADEMARK OFFICE
CERTIFICATE OF CORRECTION

PATENT NO. : 11,048,819 B2
APPLICATION NO. : 16/741193
DATED : June 29, 2021
INVENTOR(S) : Pihur Page 1 of 1

It is certified that error appears in the above-identified patent and that said Letters Patent is hereby corrected as shown below:

In the Claims

In Column 24, Line 35, in Claim 1, delete "A" and insert --Δ-- therefor

In Column 26, Line 21, in Claim 13, delete "otherwise;" and insert --otherwise,-- therefor In Column 26, Line 22, in Claim 13, after "random", delete a linebreak In Column 26, Line 33, in Claim 14, delete "processor;" and insert --processor,-- therefor In Column 26, Line 44, in Claim 14, delete "in" and insert --m-- therefor In Column 26, Line 44, in Claim 14, delete "A" and insert --Δ-- therefor In Column 26, Line 51, in Claim 14, delete "inp" and insert --input-- therefor In Column 26, Line 52, in Claim 14, after "m", insert --,--

In Column 26, Line 52, in Claim 14, after "s", insert --,--

In Column 27, Line 27, in Claim 19, after "d", insert --,--

Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office*